US010824126B2

(12) United States Patent
Doppelhamer et al.

(10) Patent No.: US 10,824,126 B2
(45) Date of Patent: Nov. 3, 2020

(54) DEVICE AND METHOD FOR THE GESTURE CONTROL OF A SCREEN IN A CONTROL ROOM

(71) Applicant: ABB TECHNOLOGY AG, Zürich (CH)

(72) Inventors: Jens Doppelhamer, Ladenburg (DE); Kristoffer Husoy, Oslo (NO); Martin Hollender, Dossenheim (DE); Mikko Rissanen, Kungsängen (SE); Torgeir Enkerud, Oslo (NO)

(73) Assignee: ABB Schweiz AG, Baden (CH)

( * ) Notice: Subject to any disclaimer, the term of this patent is extended or adjusted under 35 U.S.C. 154(b) by 953 days.

(21) Appl. No.: 14/054,531

(22) Filed: Oct. 15, 2013

(65) Prior Publication Data

US 2014/0121790 A1 May 1, 2014

Related U.S. Application Data

(63) Continuation of application No. PCT/EP2012/055862, filed on Mar. 30, 2012.

(30) Foreign Application Priority Data

Apr. 15, 2011 (DE) .................. 10 2011 017 305

(51) Int. Cl.
G05B 15/02 (2006.01)
G05B 19/042 (2006.01)

(52) U.S. Cl.
CPC ......... *G05B 15/02* (2013.01); *G05B 19/0423* (2013.01); *G05B 2219/35444* (2013.01)

(58) Field of Classification Search
CPC .............. G05B 15/02; G05B 19/0423; G05B 2219/35444; G05B 2219/23417;
(Continued)

(56) References Cited

U.S. PATENT DOCUMENTS 5,287,390 A * 2/1994 Scarola ................. G21D 3/04
  376/216
6,421,571 B1 * 7/2002 Spriggs ................. G05B 15/02
  345/629

(Continued)

FOREIGN PATENT DOCUMENTS

DE  199 18 072 A1  6/2000
DE  102004021379  *  6/2005  ............... G06F 3/00
(Continued)

OTHER PUBLICATIONS

International Search Report (PCT/ISA/210) dated Aug. 8, 2012, by the European Patent Office as the International Searching Authority for International Application No. PCT/EP2012/055862.

*Primary Examiner* — Vinh T Lam
(74) *Attorney, Agent, or Firm* — Barnes & Thornburg LLP

(57) ABSTRACT

An operation and observation system of a technical plant and/or a technical process and associated method are provided for operating components and for displaying measurement readings, process variables and/or status messages of the components of the plant and/or process. The system includes at least one large screen for displaying the components of the technical process and/or technical plant, and a plurality of operator workstations. A movement detection and movement control component is installed on the screen and on the operator workstations, which allows an operation and/or polling of the components, the measurement readings, the process variables and/or the status messages of the components of the technical plant or of the technical process by means of a body movement of an operator.

19 Claims, 2 Drawing Sheets

(58) Field of Classification Search
CPC .... G05B 2219/2642; G05B 2219/2614; G05B 2219/25106; G05B 23/0272; G05B 2219/32235; G05B 2219/31396; G05B 19/042; G05B 23/0267; G05B 2219/23043; G05B 19/19; G06F 3/048; G06F 17/274; G06F 3/167; G06F 1/1626; G06F 1/1686; G06F 2200/1637; G06F 3/017; G06F 17/30038; G06F 8/34; G06F 8/36; G06F 1/16; G06F 3/00; G11B 27/3027; G11B 27/28; G10L 15/22; G10L 2015/088; G10L 15/26; G09G 2320/0261; G06K 9/00221; G06Q 10/087
USPC .................................. 345/156, 173; 700/83
See application file for complete search history.

(56) References Cited

U.S. PATENT DOCUMENTS

| | | | | |
|---|---|---|---|---|
| 6,490,490 B1* | 12/2002 | Uchikubo | ........... | A61B 1/00045 700/65 |
| 6,571,273 B1* | 5/2003 | Shirai | ................... | G05B 19/042 709/201 |
| 6,603,494 B1* | 8/2003 | Banks | ..................... | G16H 40/63 715/807 |
| 6,911,969 B1* | 6/2005 | Nelson | ..................... | G06F 1/163 345/163 |
| 7,069,516 B2* | 6/2006 | Rekimoto | ............... | G06F 3/011 715/757 |
| 7,867,532 B2* | 1/2011 | Freeman | ................... | A23L 7/10 426/231 |
| 7,894,918 B2* | 2/2011 | Kanodia | ............ | G05B 23/0216 700/17 |
| 8,447,572 B2* | 5/2013 | Ishikawa | ................. | G06F 30/23 703/1 |
| 8,490,877 B2* | 7/2013 | Kearney | ............. | G06K 7/10881 235/462.45 |
| 8,555,171 B2* | 10/2013 | Kuo | ........................ | G06F 3/017 715/727 |
| 8,760,471 B2* | 6/2014 | Ihara | ..................... | G02B 27/017 345/633 |
| 8,766,877 B2* | 7/2014 | Saito | ................... | B61L 15/0036 345/2.1 |
| 8,768,902 B2* | 7/2014 | Aitken | ................... | G06F 16/217 707/703 |
| 8,938,690 B1* | 1/2015 | Khouri | ................... | G06Q 50/01 715/808 |
| 2002/0044104 A1* | 4/2002 | Friedrich | ............. | G05B 19/409 345/8 |
| 2003/0020715 A1* | 1/2003 | Sakakura | ................ | G06T 15/00 345/424 |
| 2004/0075689 A1* | 4/2004 | Schleiss | ............. | G05B 23/0267 715/771 |
| 2004/0078094 A1* | 4/2004 | Nagatsuka | ........... | G05B 19/042 700/9 |
| 2004/0267385 A1* | 12/2004 | Lingemann | ............ | G05B 15/02 700/83 |
| 2005/0222698 A1* | 10/2005 | Eryurek | .................... | G06F 8/34 700/90 |
| 2006/0187196 A1* | 8/2006 | Underkoffler | ...... | G06K 9/00375 345/156 |
| 2007/0106950 A1* | 5/2007 | Hutchinson | .......... | H04N 9/3102 715/761 |
| 2007/0132779 A1* | 6/2007 | Gilbert | .................. | H04L 67/289 345/619 |
| 2007/0200846 A1* | 8/2007 | Nakamura | .............. | G06F 30/00 345/419 |
| 2008/0005702 A1* | 1/2008 | Skourup | ................. | G06F 3/011 715/848 |
| 2008/0100570 A1* | 5/2008 | Friedrich | ............. | G05B 19/409 345/156 |
| 2008/0271053 A1* | 10/2008 | Kramer | ................... | G06F 9/451 719/318 |
| 2009/0055741 A1* | 2/2009 | Maeda | ................... | G06Q 10/06 715/709 |
| 2009/0077055 A1* | 3/2009 | Dillon | ................... | G06F 16/337 |
| 2009/0122146 A1* | 5/2009 | Zalewski | ................ | A63F 13/04 348/169 |
| 2009/0164896 A1* | 6/2009 | Thorn | ................... | G06F 1/1686 715/700 |
| 2009/0187820 A1* | 7/2009 | Stinson | .................. | G06Q 30/06 715/238 |
| 2009/0254370 A1* | 10/2009 | Kondo | ................... | G16H 15/00 705/3 |
| 2009/0327933 A1* | 12/2009 | Dunn | ................... | G06F 16/447 715/764 |
| 2010/0007717 A1* | 1/2010 | Spektor | .................. | G06F 3/017 348/43 |
| 2010/0060570 A1* | 3/2010 | Underkoffler | ........... | G06F 3/017 345/156 |
| 2010/0070909 A1* | 3/2010 | Biltz | .................... | G06F 30/367 715/781 |
| 2010/0079462 A1* | 4/2010 | Breeds | ................. | G06T 11/206 345/440 |
| 2010/0108580 A1* | 5/2010 | Lukasik | ............ | G01N 15/0272 209/659 |
| 2010/0161108 A1* | 6/2010 | Yeager | ................ | B29C 45/2806 700/200 |
| 2010/0246571 A1* | 9/2010 | Geppert | ................ | G06F 3/0486 370/352 |
| 2010/0275139 A1* | 10/2010 | Hammack | .......... | G05B 19/0426 715/763 |
| 2011/0102459 A1* | 5/2011 | Hall | ...................... | H04W 4/021 345/633 |
| 2011/0157226 A1* | 6/2011 | Ptucha | .................... | G06T 11/60 345/638 |
| 2011/0178627 A1* | 7/2011 | Wechter | ........... | G05B 19/41875 700/109 |
| 2011/0230980 A1* | 9/2011 | Hammack | ............ | G05B 19/409 700/17 |
| 2011/0310213 A1* | 12/2011 | Garcia | .................. | H04M 3/436 348/14.05 |
| 2012/0019447 A1* | 1/2012 | Hanes | ................... | G06F 1/3265 345/168 |
| 2012/0044136 A1* | 2/2012 | Kim | .................... | H04N 21/4263 345/156 |
| 2012/0044139 A1* | 2/2012 | Kim | ..................... | G06F 3/0425 345/157 |
| 2012/0159527 A1* | 6/2012 | Perez | ............... | H04N 21/44218 725/10 |
| 2012/0176313 A1* | 7/2012 | Ryu | .................... | H04N 21/4415 345/158 |
| 2012/0226997 A1* | 9/2012 | Pang | ................... | H04L 12/1818 715/753 |
| 2012/0227004 A1* | 9/2012 | Madireddi | ............. | G06Q 10/06 715/771 |
| 2012/0253201 A1* | 10/2012 | Reinhold | ............. | H04N 13/254 600/473 |
| 2013/0061142 A1* | 3/2013 | Brier | ....................... | G06F 30/00 715/709 |
| 2013/0120449 A1* | 5/2013 | Ihara | .................... | G02B 27/017 345/633 |
| 2013/0141440 A1* | 6/2013 | Takao | ..................... | G06T 19/20 345/473 |
| 2013/0150158 A1* | 6/2013 | Kang | .................... | A63F 13/798 463/31 |
| 2013/0241834 A1* | 9/2013 | Vennelakanti | .......... | G10L 15/22 345/158 |
| 2013/0265226 A1* | 10/2013 | Park | ..................... | H04N 21/485 345/156 |
| 2013/0308825 A1* | 11/2013 | Yamazaki | ............. | G06K 9/00771 382/103 |
| 2014/0298213 A1* | 10/2014 | Huang | .................. | G06F 3/0488 715/762 |

(56) References Cited

U.S. PATENT DOCUMENTS

FOREIGN PATENT DOCUMENTS

| | | | | |
|---|---|---|---|---|
| EP | 0382391 A2 | * | 8/1990 | ......... G05B 23/0272 |
| JP | 2012174128 A | * | 9/2012 | |
| WO | WO 2010/138743 A2 | | 12/2010 | |

* cited by examiner

DEVICE AND METHOD FOR THE GESTURE CONTROL OF A SCREEN IN A CONTROL ROOM

RELATED APPLICATIONS

This application claims priority as a continuation application under 35 U.S.C. § 120 to PCT/EP2012/055862, which was filed as an International Application on Mar. 30, 2012 designating the U.S., and which claims priority to European Application 102011017305.6 filed in Europe on Apr. 15, 2011. The entire contents of these applications are hereby incorporated by reference in their entireties.

FIELD

The present disclosure relates to an operating and observation system and to a method for operating components and for presenting measured values, process variables and/or state messages from the components of a technical installation and/or a technical process. The system and method may be implemented for operating and presenting process sequences in the control room of a commercial installation, for example, an oil and gas platform, a refinery or a power station.

BACKGROUND INFORMATION

Operating and observation systems used at present, which are also called control systems in technical installations, can be an important tool for operating personnel in order to recognize installation and/or process states and to control the installation and/or the process. Such control systems can include one or more large screens for presentation, for example, of an overview of the entire process or the entire installation, and a multiplicity of user workstations, usually with a keyboard and a mouse. The user workstations each have a specific task in the monitoring and control of the installation processes, for example, the monitoring and control of individual components or subprocesses, the detection of particular process parameters, or the management and control of the data streams that arise. In this case, the user workstations interchange a large amount of data with one another and with the large screen on the basis of the present situation and state. The presentation of the process or of the installation on the large screen can also be controlled or changed via selected user workstations. However, as soon as the operator leaves a user workstation with which the operator influences the display on the large screen, such as when several experts need to effectively work together in fault situations or when evaluating complex information, the content of the large screens is no longer able to be altered from this remote position. This results in a restriction with regard to the installation control or process guidance.

There are no inexpensive sensors that can use a plurality of cameras to set up a motion model for the users in the room. This model, which can optionally have face recognition added, can also be used to identify users. In addition, the sensors can recognize gestures. To date, such sensors can be used for computer games.

SUMMARY

An exemplary embodiment of the present disclosure provides an operating and observation system for at least one of a technical installation and a technical process for operating components and for presenting at least one of measured values, process variables and state messages from the components of the at least one of the installation and the process. The exemplary system includes at least one large display screen configured to present the components of the at least one of the installation and the process, and a plurality of user workstations. The display screen and the user workstations respectively have therein installed a controller configured to recognize and control motion. The controller is configured to allow at least one of operation and polling of at least one of the components, the measured values, the process variables and the state messages from the components of the at least one of the installation and the process by means of a body movement from a user.

An exemplary embodiment of the present disclosure provides a method for operating components and for presenting at least one of measured values, process variables and state messages from the components of a at least one of a technical installation and a technical process. The exemplary method includes presenting, on at least one of a large display screen and a multiplicity of user workstations, the components, measured values, process variables and state messages from the components of the at least one of the installation and the process. The exemplary method also includes operating, on at least one of the screen and the user workstations, a respective controller to execute at least one of operation and polling of at least on eof the components, the measured values, the process variables and the state messages from the components of the at least one of the installation and the process by means of a body movement from a user.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
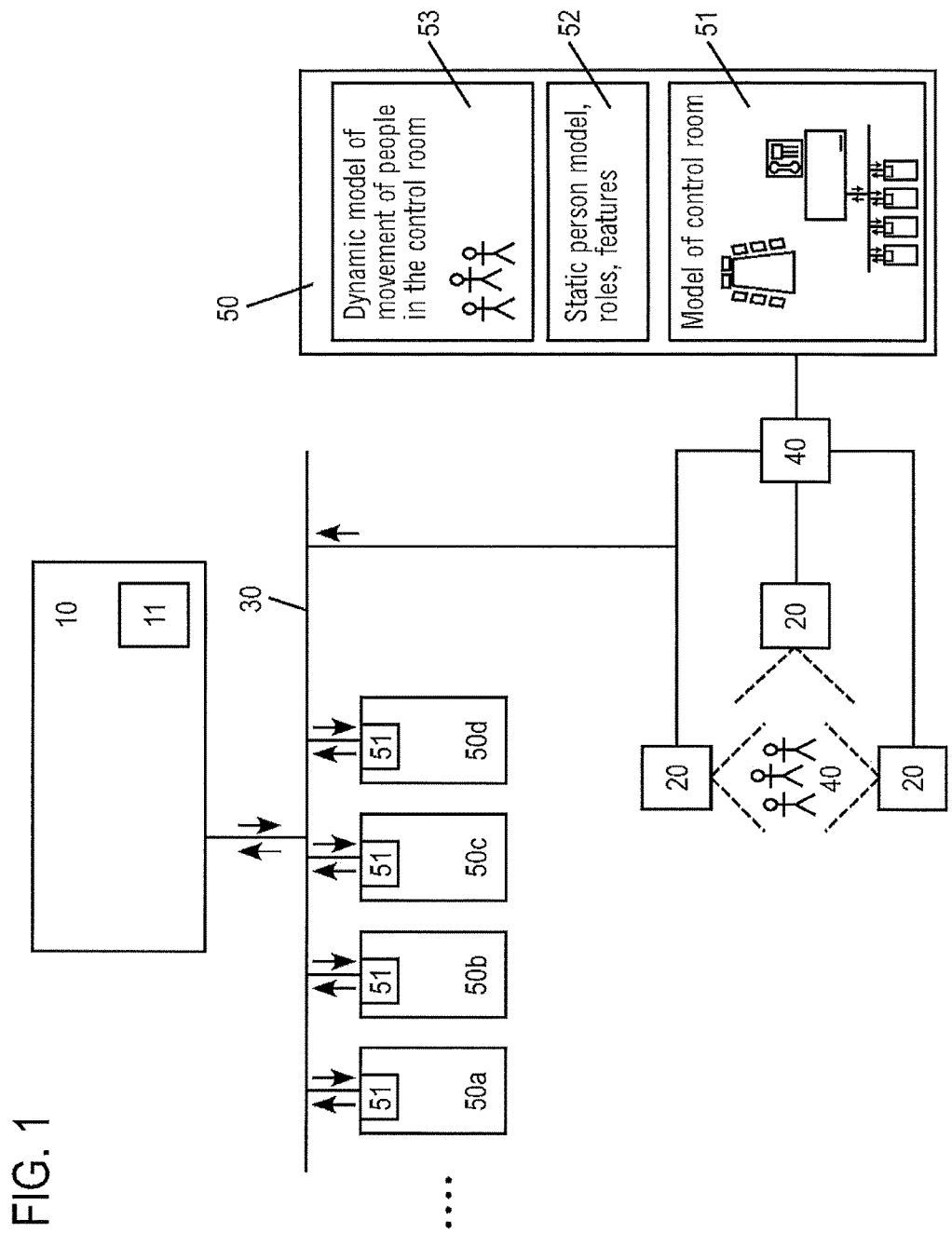
FIG. 1 shows an operating and observation system of a power station according to an exemplary embodiment of the present disclosure.

Exemplary embodiments of the present disclosure provide an operating and observation system as well as a method for operating components and for presenting measured values, process variables and/or state messages from the components of a technical installation and/or technical process that overcome the aforementioned drawbacks of known techniques and that can be suitable for clear and simple presentation and operation of a commercial installation or process, such as when the users of the installation can be away from their user workstations in order to effectively work together or exchange experience in fault situations or when evaluating complex information.

Exemplary embodiments of the present disclosure provide an operating and observation system and an associated method as described herein. Additional advantages and features of the operating and observation system as well as the method are described in more detail below with reference to exemplary embodiments of the present disclosure.

According to an exemplary embodiment, the operating and observation system includes at least one large display screen for presenting the components, measured values, process variables and/or state messages from the components of the installation and/or the process in the technical process and/or the technical installation, and a multiplicity of user workstations.

According to an exemplary embodiment of the present disclosure, a superordinate screen, also called a control screen, which can be in the form of a large screen, for example, and the user workstations of the operating and observation system have a controller configured to recognize and control motion. The controller is configured to allow at least one of operation and polling of at least one of the components, the measured values, the process variables and the state messages from the components of the at least one of the installation and the process by means of a body movement from a user.

The screen and the user workstations each include a non-transitory computer-readable recording medium (e.g., ROM, a hard disk drive, flash memory, optical memory, etc.) and a processor that is configured to execute computer-readable instructions and/or programs to carry out the operative functions described herein. According to an exemplary embodiment, the respective controllers comprised in the screen and user workstations are implemented by the respective processors of the screen or user workstations executing motion recognition and motion control software (hereinafter control software or software) tangibly recorded in the corresponding non-transitory computer-readable recording medium allows operation and/or polling of the components, the measured values, the process variables and/or state messages from the components of the technical installation and/or the technical process by means of a body movement from the user. To this end, selected components, measured values, process variables and/or the state messages from the components of the installation and/or the process can be presented as objects that can be operated by gestures, such as hand movements, for example, and that can be controlled by movement sequences from a human being. The operative features of the controller will mostly be described hereinafter with respect to the features the controller performs. However, it is to be understood that the respective processors of the screen and user workstations implement the controller by executing the controller software tangibly recorded on the corresponding non-transitory computer-readable recording medium thereof. The processors may general purpose processors such as those produced by Intel® or AMD®, for example, or they may be application specific processors specifically designed to perform the operative functions as described herein.

The software has a position recognition module that, when executed by the corresponding processor, determines the position of the individual users of the installation within the control room. In a first step, a gesture from the user is used to point to an object, for example, a pump symbol. In a second step, an acknowledgement is produced to indicate that the object has been selected, for example, by changing the color of the background behind the symbol. Optionally, this selection can be confirmed by a further gesture, which is in turn acknowledged, for example, by changing the color of the background again.

In a further step, the action that is intended to be applied to the selected object is then selected. One option is for this to be done by means of a specific gesture: for example, it is possible for gestures to be defined that switch off the messages, trends or video images associated with the object. Alternatively, a further gesture is used to select a predefined target area, for example, a screen with an alarm and message list that then specifically indicates the messages associated with the object. This can appear to the operator as though he is able to move objects to and fro between different screens. In accordance with an exemplary embodiment of the operating and observation system, the user relates gestures to real articles. By way of example, the user uses a specific gesture to an alarm horn to acknowledge an audible alarm. A further gesture to a conference table allows specific views that provide particular assistance for a shift supervisor conference to be put onto the large screens. If he moves the telephone onto the loudspeaker, the telephone is switched to conference mode. To this end, the real articles are provided with recording and processing modules, for example, with sensors, that record the relevant gestures, process them and transmit them to the motion recognition and motion control software for further processing.

In addition, at least one recording unit for recording movements is provided that is capable of recording defined movements and gestures from a user, converting them into a signal, subsequently also called a motion signal, and providing this motion signal for the software installed on the screen and the user workstations for further processing. This advantageously allows navigation through the technical installation or the technical process by means of a movement from the installation user. The recording unit can be arranged, for example, at a location where the users have an optimum overview of the entire installation or the entire process, such as close to or in the surroundings of the large screen, for example.

This allows users of the installation to now control the functions of the operating and observation system that were previously executable by means of keyboard and mouse by virtue or their movement. To this end, the software for motion recognition and control is installed on the screen and the user workstations and executed by their corresponding processors.

This means that the users no longer need to be directly in front of the screens of their respective user workstations but rather are also able to navigate directly in front of the large screen. Further advantages that arise from the motion navigation, for example, on the large screen, are the reduction in the monotonous and low-motion work of the installation user at his own screen workstation.

In accordance with an exemplary embodiment, there can be at least one additional recording unit, for example a microphone, provided for recording ambient sounds, such as the human voice. The additional recording unit has an apparatus for recording spoken words and a processing unit (including a processor configured to execute a program tangibly recorded on a non-transitory computer-readable recording medium) connected thereto that takes the recording of the spoken words and produces a further signal that can be used, as described previously, to execute operation and/or polling of the components, the measured values, the process variables and/or the state messages from the components of the technical installation or the technical process.

According to the an exemplary embodiment of the present disclosure, the screen and the user workstations of the operating and observation system have, to this end, an installed piece of voice recognition software that allows operation and/or polling of the components, the measured values, the process variables and/or the state messages from the components of the technical installation or the technical process by means of spoken words from the user. To this end, selected components, measured values, process variables and/or state messages from the components of the installation or the process can be provided as objects that can be operated by voice, for example, spoken commands, and that can be controlled by sounds from a human voice.

The motion recognition and motion control software allow the users of the technical installation free movement in the control room and free navigation on the large screens from any position within the control room.

To this end, the present disclosure provides a model that shows the control room and depicts which device (screens, tables, telephones, alarm horns, etc.) is situated where within the control room. By way of example, such a model can be created using a CAD program. The model is set up to present the relationships between the gestures and the real articles by means of the gesture controller and to provide the gestures to particular screens and/or real articles. By way of example, it thus becomes possible to drag a symbol to and fro between two different user stations or computer systems or even to also involve real articles, such as a telephone, in the navigation.

Using the model, the gesture controller recognizes the target system to which a gesture relates. The gesture controller sends selection and position information to the recognized target system. The target system evaluates the received information and initiates appropriate actions (for example the visual display of a selection) and returns appropriate information as a response (for example which pump has been selected).

In accordance with an exemplary embodiment of the system, the gesture controller can be in the form of a superordinate or central gesture controller and forwards the reported-back information to other systems. If a sensor for the gesture controller does not adequately cover the entire control room, it is also possible for a plurality of sensors to be coordinated centrally.

In comparison with the gesture control systems known from the gaming field, the operating and observation system of the present disclosure is advantageously designed such that the gesture controller for control rooms is capable of coordinating a plurality of mutually independent computer systems and to this end uses a detailed model of the environment, for example, of the real articles that can be arranged within the control room.

An exemplary embodiment of the present disclosure also provides a method that involves the operating and observation of components and the presentation of measured values, process variables and/or state messages from the components of a technical installation and/or a technical process on at least one large screen and a multiplicity of user workstations being achieved by presenting components, measured values, process variables and/or state messages from the components of the technical process or the technical installation being presented. According to the an exemplary embodiment of the present disclosure, the screen and the user workstations each respectively have a piece of motion recognition software installed on them that is, when executed by their corresponding processors, used to execute operation and/or polling of the components, the measured values, the process variables and/or the state messages from the components of the technical installation or the technical process by means of a body movement from a user.

Selected components, measured values, process variables and/or state messages from the components of the installation or the process can be presented as objects that can be operated by gestures and that can be controlled by sequences of movements from a user.

A recording unit is used to record previously defined movements and gestures from a user and to convert them into a motion signal, and the motion signal is provided for the software installed on a screen and the user workstations for further processing.

An exemplary navigation task that the user executes using the operating and observation system of the technical installation and/or the technical process involves selection of detailed information that can be selected, by way of example, from an overview image—presented on the large screen—including a multiplicity of components or objects that are presented there, such as measured values, process variables and/or state messages from the components. By way of example, it is possible to select a specific trend presentation for a process variable from a number of presentable process variables that often amounts to thousands.

To this end, a number of navigation windows that can be operated by means of previously defined gestures is set up on the large screen or else on selected screens of the user workstations. In this case, the navigation windows allow navigation into background sub-areas by means of a stored hierarchic structure for the components of the installation or the process. By way of example, provision is made for various gestures or hand movements to be used to easily navigate from an overview image of a power station firstly into what can be known as area images, which show the turbine regulation, the feed water system or else the condensate system, for example, and then into what can be known as detail images, which show individual drives or measured values, so as to retrieve detailed information presented there or to control the components that can be visible there by means of a movement from a user.

The method sequence for the navigation through the various area and detail images of the installation or the process can proceed on the basis of the following motion-controlled scheme:

Scrolling through the navigation windows on the screen of a selected user workstation to the detail image of interest by means of a first gesture, for example a first hand movement.

Selection of the component presented on the detail image by means of a second gesture, for example a second hand movement.

The selected component is automatically presented on the overview image on the large screen.

The user can therefore advantageously use a user station to single out a particular object or a particular component, which results in the singled-out object or the singled-out component being presented on the large screen by virtue of a particular movement from the user using the installed motion controller software. The method sequence can also be executed in reverse order. In this case, the user uses a previously defined gesture on the large screen to single out a particular object or a particular component, which results in the singled-out object or the singled-out component being presented on a user station by virtue of a particular movement from the user using the installed motion software.

In accordance with an exemplary embodiment of the operating and observation system, provision is also made for the installed motion controller software to be used to navigate from the overview image or area images presented on the large screen into the detail images, for example, on the individual user workstations.

An example of this is the following method sequence. The user uses his hand to point to an area or an object on the large screen. The installed software prompts the process graphics associated with the selected area or with the selected object, for example, a trend indicator or associated alarm messages, to be shown on a selected user workstation in a previously stipulated detail image or a previously stipulated object in the process or the installation. The links required for this purpose between the presentation on the large screen and the presentations on the user workstations can be stored in the installed software.

According to an exemplary embodiment, the operating and observation system also provides for selection of a particular component on the overview image of the large screen by means of a gesture, for example, the gripping movement, using the links—which can be programmed in the installed software—between the large screen and the user workstations to be followed by the opening of an operating window on a selected user workstation and the operation of the component, for example, a motor, a pump or a valve, the influencing of the setpoint value for a regulator, the changeover between manual and automatic operation or the interruption of a process that is leading to a critical state.

In addition, the motion controller software installed on the inventive operating and observation system is also capable of not only processing successively executed movements but also processing simultaneously executed sequences of movements for operating and/or polling the components of the technical installation or the technical process. An example of this is what is known as a two-handed operation. In this case, one hand is used to point to the component to be selected, and the other hand is used to operate this component.

In accordance with an exemplary embodiment of the operating and observation system, there is provided an additional face and motion recognition functionality that is capable of recognizing which and how many users can be in the control room of the installation and where they can be within the room or when the users have entered or left the installation. To this end, there can be an access control provided, for example, at the entrance to the room, that is coupled to the motion software of the operating and observation system and exchanges corresponding signals with the system. To this end, the operating and observation system in one particular embodiment is equipped with a display apparatus that displays appropriate information about identity, number and the whereabouts of the users within the room, for example in a window provided on the large screen and/or the user workstations.

In accordance with an exemplary embodiment of the present disclosure, the distance of the person or user situated closest to the large screen is detected and, depending on the magnitude of the distance of the person situated closest to the large screen, the display of the large screen is optimized, for example, by virtue of selection of the font size and the level of detail for the presentation on the screen.

In accordance with an exemplary embodiment of the present disclosure, the motion recognition software generates a signal or a pulse when no movement is registered over a previously stipulated period. This pulse can initiate a horn, for example, and/or ask the user to make a particular input. This makes it possible to ensure that the user does not fall asleep.

According to an exemplary embodiment, the motion software and/or the voice recognition software is/are equipped with special filter systems that transmit only previously stipulated gestures and/or spoken commands to the operating and observation system for further processing. This prevents conversions between the users, for example, which can be often also supported by gestures, from resulting in uncontrolled operation or polling of the installation or the process.

FIG. 1 shows an exemplary operating and observation system in a power station for presenting the components, measured values, process variables and/or state messages for the components of the power station with a multiplicity of user workstations 50a, 50b, 50c, 50d that can be connected to a large screen 10 by means of a bus system 30.

The large screen 10 presents an overview image of the power station with appropriate selection points for the various sub-areas of the power station process.

According to an exemplary embodiment of the present disclosure, the large screen 10 and the user workstations 50a, 50b, 50c, 50d of the operating and observation system have an installed piece of motion recognition software 11, 51 that are tangibly recorded on a non-transitory computer-readable recording medium and executed by a corresponding processor, as described above, and that allows operation and/or polling of the components, the measured values, the process variables and/or the state messages from the components of the power station by means of a body movement from at least one user 40.

To this end, selected components, measured values, process variables and/or state messages from the components can be presented as objects that can be operated by gestures, such as hand movements, for example, and that can be controlled by sequences of movements from a human being 40.

A recording unit 20 that is likewise connected to the bus system 30 is used to record previously defined sequences of movements from the users 40 and to convert them into a motion signal, which is then transmitted via the bus system 30 to the screen workstations 50a, 50b, 50c, 50d and the large screen 10 for further processing by means of the motion recognition software 11, 51.

In accordance with an exemplary embodiment, sensors can be provided that use a plurality of cameras 20 to set up a motion model for the users in the room 30. This model, which can optionally have face recognition added, can also be used to identify users. In addition, the sensors can recognize gestures.

The model 50 is used by the gesture controller to recognize the target system to which a gesture relates. The gesture controller sends selection and position information to the recognized target system. The target system evaluates the received information and initiates appropriate actions (for example the visible display of a selection) and returns appropriate information as a response (for example which pump has been selected).

In addition, the disclosure provides a model 50 that uses a first component 51 to depict the control room and shows which device (screens, tables, telephones, alarm horns, etc.) is situated where within the control room.

The model 50 optionally has a second component 52, which depicts a static person model that stores identification features of the users of the control room, for example.

The model 50 optionally has a further component 53, which depicts a dynamic motion model, that is to say a model of the persons in the control room.

In accordance with an exemplary embodiment of the system, the gesture controller is in the form of a superordinate or central gesture controller and forwards the reported-back information to other systems. If a sensor for the gesture controller does not adequately cover the entire control room, it is also possible for a plurality of sensors to be coordinated centrally.

Figure 2:
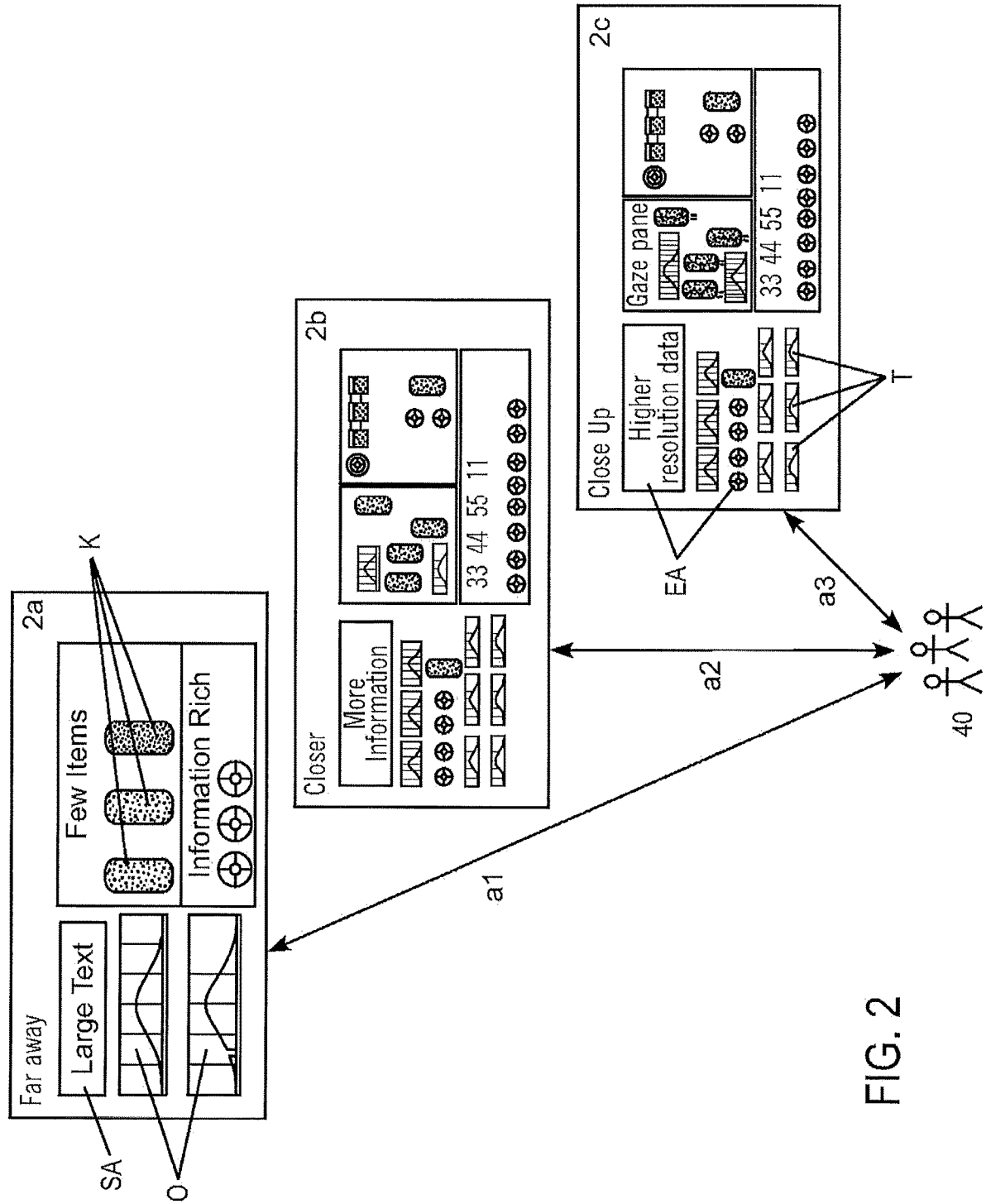
FIG. 2 shows an operating and observation system according to an exemplary embodiment of the present disclosure.

FIG. 2 shows an exemplary embodiment of the operating and observation system in which the presentation of components and objects of the power station on the large screen is altered on the basis of the location of the user, that is to say that the content visible on the screen is adjusted in line with the changing distance of the user from the screen.

The form of presentation denoted by the reference symbol 2a is chosen when the user is at a great distance in front of the screen. Now, only a few components K and objects O can be presented. If the user moves further toward the screen, the distance a1 between the screen and the user is reduced and, after a predefined distance a2, a3 from the screen, the interaction of motion recognition software 11, 51 and recording unit 20 is used to open previously stipulated detail information, such as different trend presentations T for a measured value or a split for a collective alarm SA, shown previously in FIG. 2a, into individual alarms EA, for the previously presented components K and objects O, as shown by illustrations 2b and 2c.

The method sequence is illustrated below using the example of the pump object. First of all, the object is "captured". To this end, the user first of all points to the pump symbol, and an acknowledgement that the "pump" object is in focus is provided. The pump object is then selected by a gesture, which can also be very implicit. In the text below, an acknowledgement that the object has been selected is created.

In a subsequent step, the pump object is used by first of all pointing to a target action, for example a message list. Alternatively, the target action can also be chosen by a specific gesture. Following application of the target action to the previously captured object, that is to say the presentation of the messages associated with the pump in the message list, the pump is dragged from the overview image into the message list.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. An operating and observation system for a technical installation, the operating and observation system comprising:
    a gesture controller configured to operate components of the technical installation and for presenting at least one of measured values, process variables and state messages from the components of the technical installation in a control room;
    at least one large display screen in the control room, and a plurality of user workstations for presenting, in the control room, the components of the technical installation and the at least one of the measured values, process variables and state messages from the components of the technical installation; and
    a plurality of sensors each configured to recognize gestures constituting physical movements,
    wherein the large display screen and the user workstations respectively have therein installed a motion recognition and motion controller configured to recognize and control motion,
    wherein the motion recognition and motion controller is configured to allow at least one of operation and polling of at least one of the components, the measured values, the process variables and the state messages from the components of the at least one of the technical installation by means of a gesture from at least one user in the control room, the gesture constituting a physical movement,
    wherein the motion recognition and motion controller comprises a position recognition controller configured to determine a position of individual users of the technical installation within the control room, by using a model of the control room to identify a target system in the control room to which a gesture of the at least one user relates, the model using a first component to depict the control room and showing where at least one device is situated in the control room, and
    wherein the motion recognition and motion controller is configured to, based on the gesture of the at least one user, send selection and position information to the identified target system for evaluation and initiation of appropriate actions,
    wherein the motion recognition and motion controller is further configured to:
    provide an identification for a person who is in front of the large screen and an identification of the person is usable as a basis for presenting views tailored specifically to the identified person.

2. The operating and observation system as claimed in claim 1, wherein the views that have sensitive information are automatically closed if there is no identification for a relevant person.

3. The operating and observation system as claimed in claim 1, comprising:
    at least one recording unit configured to record spoken words and interact with a processing unit connected thereto that is configured to produce from the recorded spoken words an execution signal to execute at least one of the operation and polling of the components, the measured values, the process variables, and the state messages from the components of the technical installation.

4. The operating and observation system as claimed in claim 3, wherein the large screen and the user workstations comprise a respective processor configured to execute voice recognition software tangibly recorded on a non-transitory computer-readable recording medium to execute the at least one recording unit.

5. The operating and observation system as claimed in claim 4, wherein at least one of selected components, measured values, process variables and state messages from the components are presented as objects to be operated by spoken commands.

6. The operating and observation system as claimed in claim 1, comprising:
    at least one recording unit configured to record previously defined movements and gestures from a user, convert the previously defined recorded movements and gestures into a motion signal, and provide the motion signal for the motion recognition and motion controller installed on the large screen and the user workstations for further processing.

7. The operating and observation system as claimed in claim 6, wherein the motion recognition and motion controller is further configured to:
    provide an identification for a person who is in front of the large screen and an identification of the person is usable as a basis for presenting views tailored specifically to the identified person.

8. The operating and observation system as claimed in claim 7, wherein the views that have sensitive information are automatically closed if there is no identification for a relevant person.

9. The operating and observation system as claimed in claim 7, comprising:
at least one recording unit configured to record spoken words and interact with a processing unit connected thereto that is configured to produce from the recorded spoken words an execution signal to execute at least one of the operation and polling of the components, the measured values, the process variables, and the state messages from the components of the installation.

10. The operating and observation system as claimed in claim 9, wherein the large screen and the user workstations comprise a respective processor configured to execute voice recognition software tangibly recorded on a non-transitory computer-readable medium to execute the at least one recording unit.

11. The operating and observation system as claimed in claim 10, wherein at least one of selected components, measured values, process variables and state messages from the components are presented as objects to be operated by spoken commands.

12. The operating and observation system as claimed in claim 1, wherein the motion recognition and motion controller is configured to:
detect a gesture to move a first representation of a telephone in the control room to a second representation of a loudspeaker; and
operate, in response to the detection of the gesture, the telephone in a conference mode.

13. The operating and observation system as claimed in claim 1, wherein the motion recognition and motion controller is configured to:
detect a gesture indicative of a gripping movement; and
control, in response to the detection of the gesture, an operation of at least one of a motor, a pump, or a valve as a function of the gripping movement.

14. The operating and observation system as claimed in claim 1, wherein the motion recognition and motion controller is configured to:
store a hierarchical structure of data indicative of components of the technical installation; and
present information associated with a first level of the hierarchical structure;
detect one or more gestures indicative of a request to navigate to a different level of the hierarchical structure; and
present, in response to the detection of the one or more gestures, information associated with the different level of the hierarchical structure.

15. The operating and observation system as claimed in claim 1, wherein the identified target system is one of the user workstations, and wherein to send the selection and position information further comprises to send a request to the user workstation to transfer information previously controlled by the user workstation to the large display screen.

16. The operating and observation system as claimed in claim 1, wherein the motion recognition and motion controller is configured to:
determine a distance of each user from the large display screen;
identify the distance of the user situated closest to the large display screen;
determine, as function of the identified distance of the user situated closest to the large display screen, a level of detail of information to be presented on the large display screen.

17. The operating and observation system as claimed in claim 16, wherein the motion recognition and motion controller is further configured to select, as a function of the identified distance of the user situated closest to the large display screen, a font size to be used for presentation of the information on the large display screen.

18. The operating and observation system as claimed in claim 1, wherein the motion recognition and motion controller is further configured to:
determine an amount of time that has elapsed since a gesture has been recognized;
determine whether the elapsed amount of time satisfies a predefined threshold; and
activate, in response to a determination that the elapsed amount of time satisfies the predefined threshold, an audible signal in the control room.

19. A method for operating components of a technical installation with a gesture controller and for presenting at least one of measured values, process variables, and state messages from the components of the technical installation in a control room, the method comprising:
presenting, on at least one of a large display screen and a multiplicity of user workstations in the control room, the components, measured values, process variables and state messages from the components of the technical installation;
recognizing gestures by at least one of a plurality of sensors, the gestures constituting physical movements; and
operating, on at least one of the large display screen and the user workstations, a respective motion recognition and motion controller to execute at least one of operation and polling of at least one of the components, the measured values, the process variable and the state message from the components of the at least one of the technical installation by means of a gesture from at least one user in the control room, the gesture constituting a physical movement,
wherein the operation of the motion recognition and motion controller comprises operating a position recognition controller to determine a position of individual users of the technical installation within the control room, by using a model of the control room to identify a target system in the control room to which a gesture of the at least one user relates, the model using a first component to depict the control room and showing where at least one device is situated in the control room, and
wherein the motion recognition and motion controller, based on the gesture of the at least one user, sends selection and position information to the identified target system for evaluation and initiation of appropriate actions,
wherein the motion recognition and motion controller is further configured to:
provide an identification for a person who is in front of the large screen and an identification of the person is usable as a basis for presenting views tailored specifically to the identified person.

* * * * *